United States Patent

Brown et al.

[11] Patent Number: 5,899,399
[45] Date of Patent: May 4, 1999

[54] SEAT BELT PRETENSIONER

[75] Inventors: Louis R. Brown, Oxford; Charles E. Steffens, Jr., Washington, both of Mich.

[73] Assignee: TRW Vehicle Safety Systems Inc., Lyndhurst, Ohio

[21] Appl. No.: 08/873,499

[22] Filed: Jun. 12, 1997

[51] Int. Cl.[6] .......................... B60R 22/28; B60R 22/46
[52] U.S. Cl. ...................................... 242/324; 242/379.1
[58] Field of Search ............................ 242/374, 379.1; 280/805, 806; 297/478, 480, 471, 472

[56] References Cited

U.S. PATENT DOCUMENTS

| | | | |
|---|---|---|---|
| 3,561,690 | 2/1971 | Muskat | 242/379.1 |
| 4,232,836 | 11/1980 | Fohl . | |
| 4,273,361 | 6/1981 | Toshihiro et al. | 297/478 |
| 4,320,288 | 3/1982 | Fohl . | |
| 4,323,205 | 4/1982 | Tsuge et al. | 297/472 |
| 4,558,832 | 12/1985 | Nilsson . | |
| 5,400,983 | 3/1995 | Nishizawa et al. . | |
| 5,451,008 | 9/1995 | Hamaue . | |
| 5,526,996 | 6/1996 | Ebner et al. | 242/379.1 |
| 5,553,803 | 9/1996 | Mitzkus et al. . | |
| 5,618,006 | 4/1997 | Sayles | 242/379.1 |
| 5,676,397 | 10/1997 | Bauer | 297/480 |
| 5,743,480 | 4/1998 | Kopetzky et al. | 242/374 |

FOREIGN PATENT DOCUMENTS 581288   2/1994   European Pat. Off. .............. 242/374

OTHER PUBLICATIONS

U.S. Patent Appln. Serial No. 08/539,627, filed Oct. 5, 1995 for "Seat Belt Pretensioner Including Flexible Strap".

*Primary Examiner*—John M. Jillions
*Attorney, Agent, or Firm*—Tarolli, Sundheim, Covell, Tummino & Szabo

[57] ABSTRACT

An apparatus (10) for protecting a vehicle occupant including a vehicle seat belt webbing (20) which is extensible about a vehicle occupant, a housing (134) connectable to a component of a vehicle, and a flexible member (280) having a first end portion (284), a second end portion (286), and an intermediate portion (288) extending between the first and second end portions (284, 286). A part (310) of the intermediate portion (288) is located in the housing (134) and cooperates with the housing to define an expansible chamber (308) in the housing. The housing (134) includes a surface (156) for guiding movement of the part (310) of the intermediate portion (288) in an arcuate path (224) to expand the expansible chamber. A clutch (270), actuatable in response to expansion of the expansible chamber (308), is provided to connect the first end portion (284) of the flexible member (280) with the seat belt webbing (20). A gas generator (316) is provided for, when actuated, exerting a first force on the part (310) of the intermediate portion (288) to move the part of the intermediate portion along the arcuate path (224) in the housing (134) to expand the expansible chamber (308) and actuate the clutch and to move the first end portion (284) of the flexible member (280) in a direction to move the seat belt webbing (20) a first distance and tighten the seat belt webbing against the occupant.

18 Claims, 10 Drawing Sheets

SEAT BELT PRETENSIONER

BACKGROUND OF THE INVENTION

1. Technical Field

The present invention relates to a pretensioner for tightening a seat belt against a vehicle occupant.

2. Description of the Prior Art

Pretensioners for seat belts are known. One known pretensioner is attached to a seat belt buckle which is connectable with a tongue carried by the seat belt. Upon actuation, the pretensioner moves the buckle to move the seat belt and tighten the seat belt against a vehicle occupant.

SUMMARY OF THE INVENTION

The present invention is directed to a vehicle occupant safety apparatus. The apparatus comprises vehicle seat belt webbing which is extensible about a vehicle occupant. The apparatus further comprises a housing connectable to a component of a vehicle.

The apparatus also comprises a flexible member having a first end portion, a second end portion, and an intermediate portion extending between the first and second end portions. A part of the intermediate portion is located in the housing and cooperates with the housing to define an expansible chamber in the housing. The housing has surface means for guiding movement of the part of the intermediate portion in an arcuate path to expand the expansible chamber.

A clutch, actuatable in response to expansion of the expansible chamber, is provided to connect the first end portion of the flexible member with the seat belt webbing. The apparatus further comprises actuatable means for, when actuated, exerting a first force on the part of the intermediate portion to move the part of the intermediate portion along the arcuate path in the housing to expand the expansible chamber and actuate the clutch and to move the first end portion of the flexible member in a direction to move the seat belt webbing a first distance and tighten the seat belt webbing against the occupant.

In one embodiment, the apparatus includes an energy absorbing mechanism for dissipating energy transferred to the seat belt webbing in response to movement of the occupant against the seat belt webbing in response to a vehicle deceleration of at least a predetermined magnitude.

In another embodiment, the apparatus comprises a spool disposed within a housing. The spool is connected with an end portion of a seat belt webbing. The spool is supported for rotation in opposite directions. A spring is provided for creating a first force for winding the spool in the withdrawal direction. The apparatus further comprises an actuatable means for creating, upon actuation, a second force greater than the first force, acting on the spring to move the seat belt webbing and tighten the seat belt webbing against the occupant.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 1:
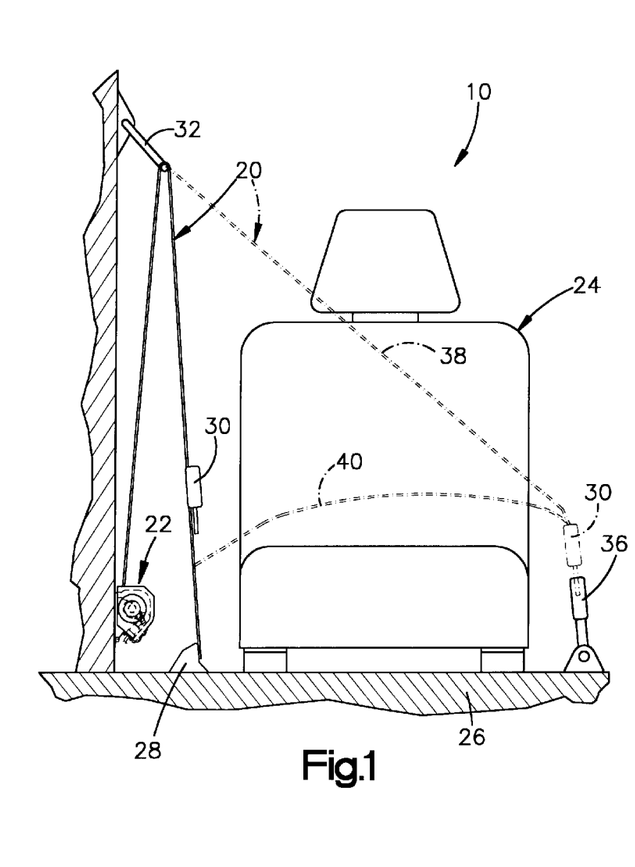
FIG. 1 is a schematic view of a vehicle seat belt restraint system including a retractor and a pretensioner constructed in accordance with the present invention.

A three-point vehicle occupant seat belt restraint system 10 embodying the present invention is illustrated in FIG. 1. A retractor 22 is incorporated in the three-point continuous loop seat belt system 10 for use in restraining an occupant of a vehicle. The retractor 22 includes a pretensioner 130 (FIG. 4) which is constructed in accordance with the present invention.

During operation of the vehicle, the occupant of the vehicle sits on a seat 24 (FIG. 1). A length of seat belt webbing 20 is extensible about the vehicle occupant. One end of the length of belt webbing 20 is anchored to the vehicle body 26 at an anchor point 28 located on one side of the seat 24. The opposite end of the belt webbing 16 is attached to the retractor 22 which is secured to the vehicle body 26 on the same side of the seat 24. Intermediate its ends, the belt webbing 20 passes through a tongue assembly 30 and a D-ring 32 that is located above the retractor 22 and the anchor point 28. When the seat belt system 10 is not in use, the belt webbing 20 is wound on the retractor 22 and is oriented generally vertically on the one side of the seat 24, as shown in solid lines in FIG. 1.

To engage the seat belt system 10, the tongue assembly 30 is manually grasped and is pulled across the lap and torso of the occupant sitting in the seat 24. As the tongue assembly 30 is pulled across the lap and torso of the occupant, the tongue assembly moves along the belt webbing 20, and the belt webbing is unwound from the retractor 22. When the belt webbing 20 has been pulled across the lap and torso of the occupant, the tongue assembly 30 is connected with a buckle 36, as shown in dashed lines in FIG. 1. The buckle 36 is connected to the vehicle body 26 and is disposed on the side of the seat 24 opposite the anchor point 28. When the seat belt system 10 is thus buckled, the length of belt webbing 20 is divided by the tongue assembly 30 into a torso portion 38 which extends across the torso of the occupant and a lap portion 40 which extends across the lap of the occupant.

The seat belt retractor 22 (FIG. 4) includes a retractor frame 82. The frame 82 has a base wall 84 for attaching the retractor 22 to the vehicle 24 (FIG. 1). The frame 82 (FIG. 4) also includes spaced, parallel side walls 86 and 88 extending from opposing sides of the base wall 84. The side wall 88 has an inner major side surface 89, which is presented toward the side wall 86, and an outer major side surface 90 parallel to, and spaced apart from, the inner side surface 89.

The side walls 86 and 88 include circular openings 92 and 94, respectively, centered on a longitudinal central axis 98 of the retractor 22. Bearings 102 and 104 are disposed in the openings 92 and 94, respectively. The bearings 102 and 104 support a retractor shaft 108 for rotation in a belt winding, or retraction, direction W (FIG. 5) and in an opposite belt unwinding, or belt withdrawal, direction. The shaft 108 has a first end 110 (FIG. 4) and a second end 112.

Figure 4:
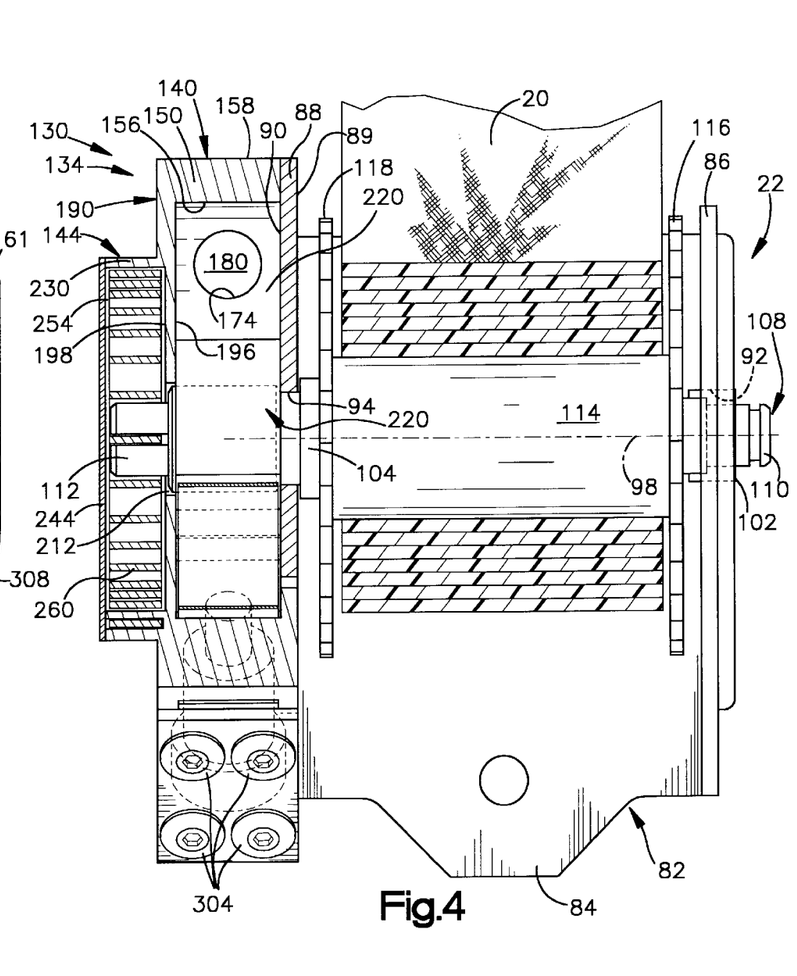
FIG. 4 is a sectional view taken along line 4—4 of FIG. 3.

A spool 114 is fixed for rotation with the shaft 108 about the longitudinal central axis 98 of the retractor 22. The spool 114 includes a pair of axially spaced ratchet wheels 116 and 118. The seat belt webbing 20 is wound around, and stored on, the spool 114, between the ratchet wheels 116 and 118.

The retractor 22 includes a locking pawl mechanism (not shown) for selectively locking the spool 114 to prevent withdrawal of the seat belt webbing 20 from the spool. The locking pawl mechanism is actuated in a known manner when the retractor 22 is subjected to a deceleration of at least a predetermined magnitude, such as can occur in a vehicle collision.

The pretensioner 130 (FIG. 4) includes a pretensioner housing 134 which is attached to the side wall 88 of the retractor frame 82. The pretensioner housing 134 has a main body portion 140 and a spring extension portion or spring housing 144.

Figure 3:
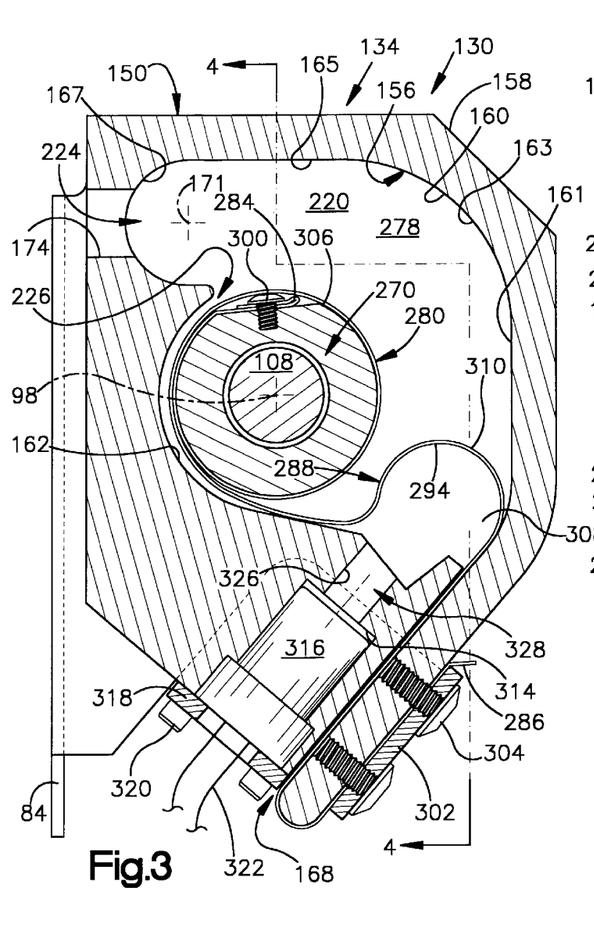
FIG. 3 is a side view, partially in section, of the retractor and pretensioner of FIG. 1.

The main body portion 140 of the pretensioner housing 134 includes a substantially D-shaped, axially extending side wall 150 (FIG. 3). The side wall 150 has an inner surface 156 and an outer surface 158. The inner surface 156 of the side wall 150 has a first substantially arcuate portion 160 and a second substantially arcuate portion 162.

The first substantially arcuate portion 160 of the inner surface 156 of the side wall 150 has a first linear portion 161 extending parallel to the central axis 98 and generally parallel to the base wall 84 of the retractor 22. A first curved portion 163 of the first substantially arcuate portion 160 connects the first linear portion 161 with a second linear portion 165 extending generally perpendicular to the base wall 84 of the retractor 22. The first substantially arcuate portion 160 of the inner surface 156 of the side wall 150 also has a second curved portion 167 centered on an axis 171.

The second linear portion 165 of the side wall 150 extends between and connects the first and second curved portions 163 and 167, respectively, of the side wall.

A cylindrical surface 174 extends between the second curved portion 167 of the inner surface 156 and the outer surface 158 of the side wall 150. The cylindrical surface 174 defines a pressure relief opening 180 in the side wall 150.

The main body portion 140 (FIG. 4) of the pretensioner housing 134 further includes a generally annular end wall 190. The end wall 190 has an inner side surface 196 and an outer side surface 198. A circular opening 212, which is concentric with the openings 92 and 94, extends axially between the inner side surface 196 and the outer side surface 198 of the end wall 190.

The spring housing 144 includes an axially extending, cylindrical side wall 230 and a radially extending, circular end wall 244. The end wall 190 of the main body portion 140 of the housing 134, and the side wall 230 and end wall 244 of the spring housing 144, define a spring chamber 254. A flat, spirally wound, metal motor spring 260 is disposed in the spring chamber 254. The motor spring 260 is connected, in a known manner, between the second end 112 of the retractor shaft 108 and the spring housing 144 and biases the retractor shaft for rotation in the belt winding direction.

Figure 2:
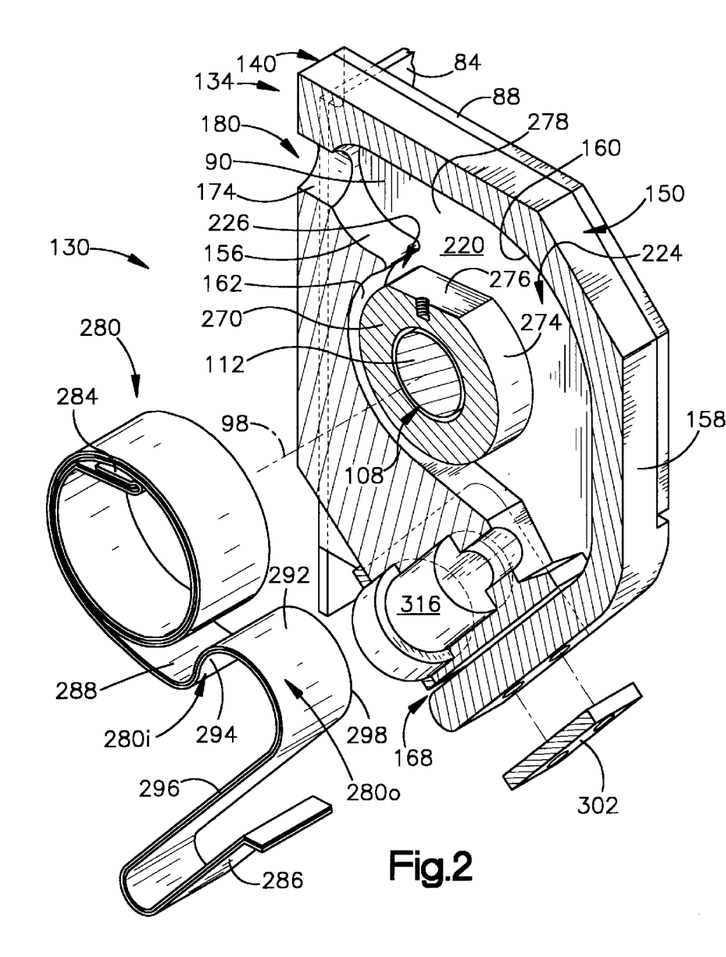
FIG. 2 is an exploded perspective view of parts of the pretensioner of FIG. 1.

A clutch mechanism, indicated schematically at 270 in FIGS. 2 and 3, of a known construction encircles a portion of the retractor shaft 108 which extends through the main body portion 140 of the pretensioner housing 134. The clutch mechanism 270 has a generally cylindrical outer surface portion 274 and a flattened surface portion 276, both of which are rotatable about the axis 98. The clutch mechanism 270, when unactuated, allows the retractor shaft 108 to rotate relative to the surface portions 274 and 276 of the clutch mechanism. The clutch mechanism 270, when actuated, connects the retractor shaft 108, and thus the spool 114 (FIG. 4), for rotation with the surface portions 274 and 276 of the clutch mechanism.

The outer major side surface 90 (FIG. 4) of the side wall 88 of the frame 82, the inner surface 156 of the side wall 150, and the inner surface 196 of the end wall 190 define a primary chamber 220 in the pretensioner 130. The primary chamber 220 (FIG. 3) has a first portion or arcuate path portion 224 and a second portion 226. The second portion 226 of the primary chamber 220 is defined in part, by the second substantially arcuate portion 162 of the inner surface 156 of the side wall 150. The second portion 226 of the primary chamber 220 is also disposed generally below and to the left of the first portion 224 as viewed in FIG. 2. The clutch mechanism 270 is disposed in the second portion 226 of the primary chamber 220.

The arcuate path portion 224 of the primary chamber 220 comprises the balance of the primary chamber. The arcuate path portion 224 of the primary chamber 220 is defined or bounded by the outer major side surface 90 of the side wall 88 of the frame 82 and the inner side surface 196 of the end wall 190. The arcuate path portion 224 of the primary chamber 220 is also defined or bounded by the first linear portion 161 of the side wall 150, the first curved portion 163 of the side wall, the second linear portion 165 of the side wall, the second curved portion 167 of the side wall, and the outer surface portion 274 of the clutch mechanism 270.

Figure 2A:
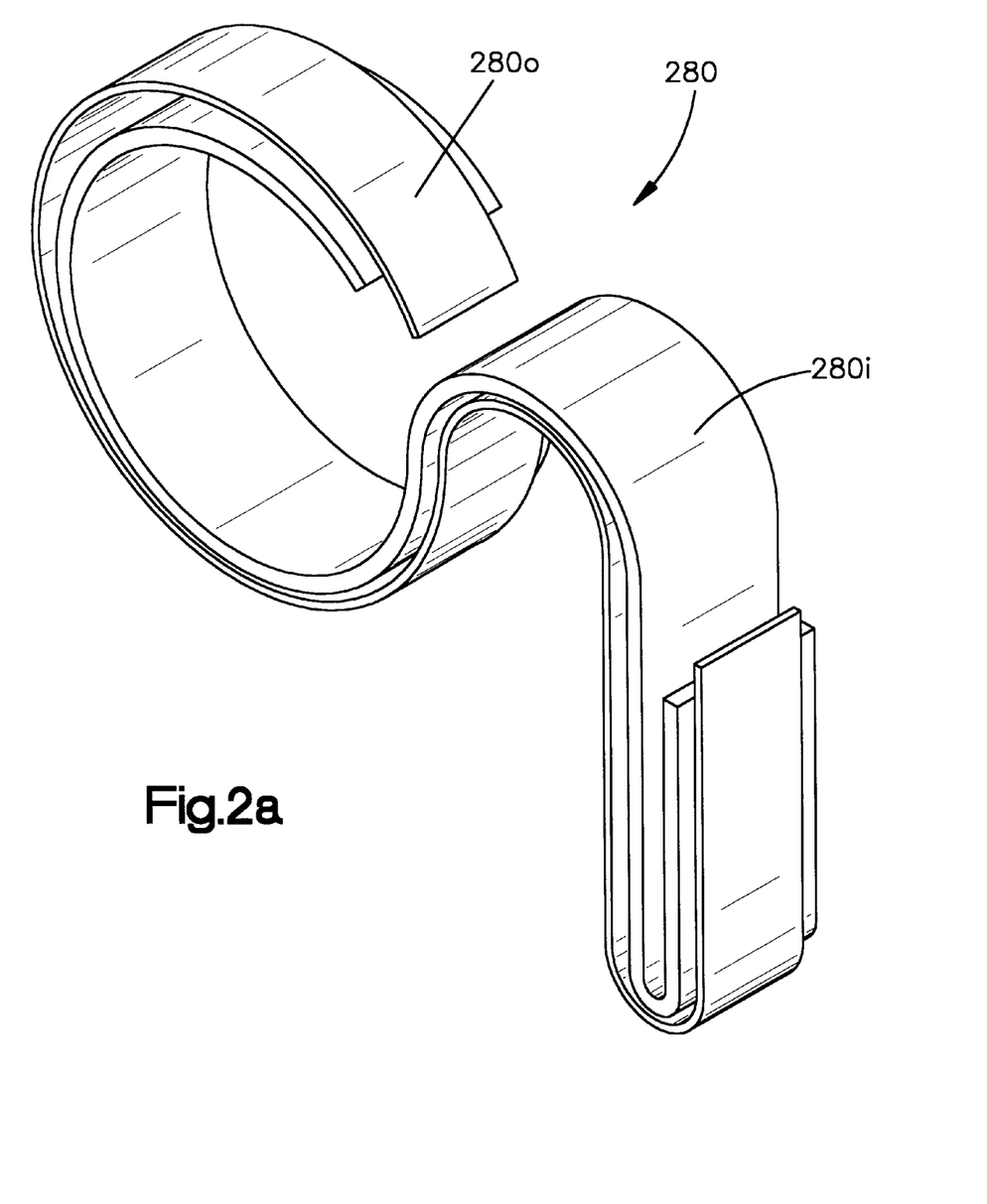
FIG. 2a is a side view of parts of the pretensioner of FIG. 2.

The pretensioner 130 includes a flexible strap member or pretensioner band 280 disposed within the primary chamber 220. The pretensioner band 280 is preferably made of work hardened 1020 steel, or spring steel. The pretensioner band 280 preferably includes two band members or straps 280*i* and 280*o* arranged in an overlying relationship as shown in FIG. 2. For clarity, only one of the spring members of the pretensioner band 280 is shown in FIGS. 3–7. The pretensioner band 280 may, alternatively, comprise a single flexible band or spring member. The inner band 280*i* can be wider and thicker than the outer band member 280*o*, as discussed below in detail and as shown in FIG. 2*a*. For clarity, the two spring members 280*i* and 280*o* are, in FIG. 2*a*, shown spaced apart from each other.

The pretensioner band 280 (FIG. 2) has parallel major side surfaces 292, 294 interconnected by parallel minor side surfaces 296, 298. The width of the pretensioner band 280, which is defined by the distance between the minor side surfaces 296, 298 (FIG. 6), is selected so that the pretensioner band fits closely between the side wall 88 (FIG. 4) of the retractor frame 82 and the end wall 190 of the pretensioner housing 134.

Most of the length of the pretensioner band 280 is disposed inside the primary chamber 220 of the pretensioner housing 134. The pretensioner band 280 has a first end portion 284 connected, preferably by a screw 300 (FIG. 3), to the flattened surface portion 276 of the clutch mechanism 270. The first end portion 284 of the pretensioner band 280 could also be fastened to the clutch mechanism 270 by other means, such as a slot and tortuous path in the clutch mechanism 270. A second end portion 286 extends through a slot 168 in the pretensioner housing 134 and is connected to the outer surface 158 of the side wall 150 by a clamp plate 302 and a plurality of screws 304. The pretensioner band 280 has an intermediate portion 288 extending between and connecting the first and second end portions 284, 286, respectively, of the pretensioner band.

The pretensioner band 280 is shown in an initial position in FIG. 3. A part 306 of the intermediate portion 288 of the pretensioner band 280 is wrapped around the outer surface 274 of the clutch mechanism 270. Another part 310 of the intermediate portion 288, located in the primary chamber 220 of the pretensioner housing 134, has an U-shaped configuration. The one major side surface 294 of the intermediate portion 288 of the pretensioner band 280, the inner surface 90 (FIG. 4) of the side wall 88 of the retractor frame 82, and the inner surface 196 of the end wall 190 define an expansible chamber 308 (FIG. 3) in the pretensioner 130. The volume of the expansible chamber 308 is determined by the position of the intermediate portion 288 of the pretensioner band 280 in the primary chamber 220.

The side wall 150 of the pretensioner housing 134 includes a cylindrical bore 314. A cylindrical surface 326 defines a passage 328 extending between the primary chamber 220 and the bore 314. An actuatable pyrotechnic gas generator 316 is secured within the bore 314 by any means such as a clamp plate 318 and a plurality of screws 320. The actuatable pyrotechnic gas generator 316 is electrically connected by lead wires 322 to vehicle electric circuitry including a controller (not shown).

In the event of vehicle deceleration above a predetermined threshold level, the vehicle electric circuitry causes electric current to flow to the gas generator 316 (FIG. 3) through the lead wires 322 to deploy the gas generator 316. The gas generator 316 produces combustion products which flow through the passage 328 into the expansible chamber 308. The combustion products pressurize the chamber 308 and apply a pressure force P (FIG. 5) to all of the surfaces 90, 196 and 294 (FIG. 5) defining the chamber 308 (FIG. 3). The minor side surfaces 296, 298 (FIG. 6) of the intermediate part 288 of the pretensioner band 280 cooperate with the inner surface 90 of the side wall 88 of the retractor frame 82, and with the inner surface 196 of the end wall 190, to inhibit flow of the gaseous combustion products of the gas generator 316 between the pretensioner band and the main body portion 140 of the pretensioner housing 134.

Figures 5, 6:
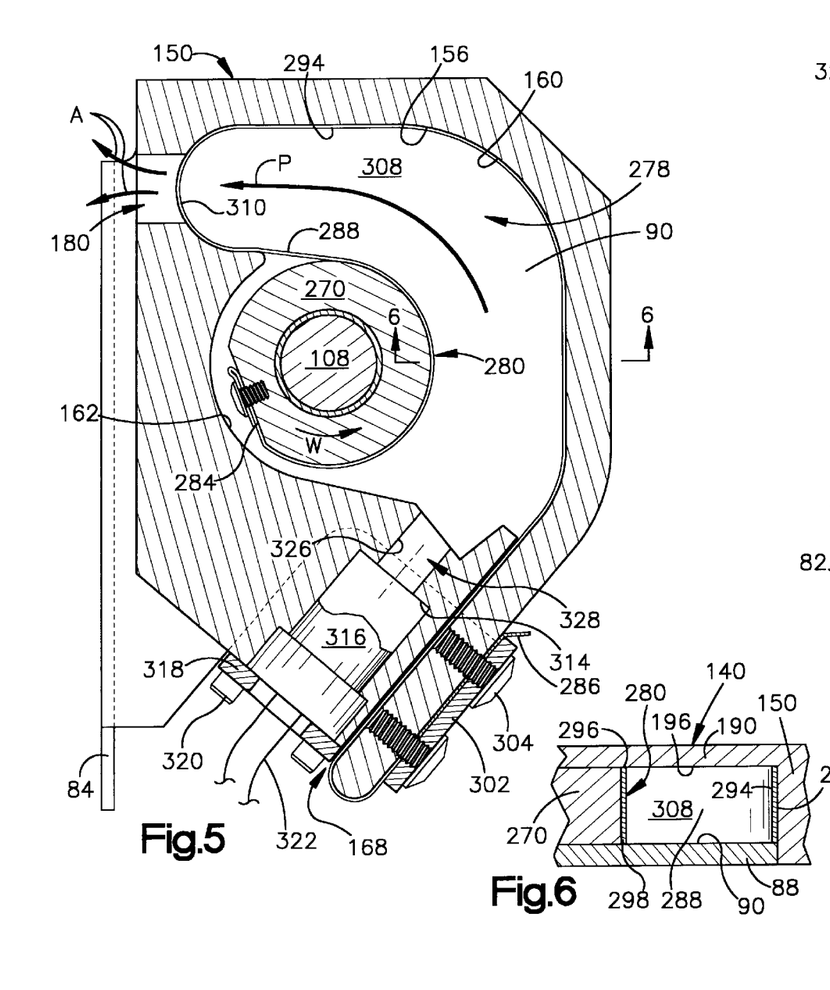
FIG. 5 is a view similar to FIG. 3 showing parts of the pretensioner in a different position.
FIG. 6 is a partial sectional view taken along line 6—6 of FIG. 5.

The pressure force P causes the U-shaped section 310 of the pretensioner band 280 to move along the arcuate path portion 224 of the primary chamber 220 from its initial position illustrated in FIG. 3 to a final position illustrated in FIG. 5. As the U-shaped section 310 moves from its initial position to its final position, the expansible chamber 308 expands from the condition shown in FIG. 3 to the condition shown in FIG. 5. Air A which was in the primary chamber 220 escapes to the atmosphere through relief opening 180.

During the movement of the pretensioner band 280 through the arcuate path portion 224 of the primary chamber 220, the part 306 of the intermediate portion 288 wrapped around the clutch mechanism 270 is unwound from the outer surface portions 274 and 276 of the clutch mechanism thereby moving the first end portion 284 of the flexible member 280. The outer surface portions 274 and 276 of the clutch mechanism 270 rotate, actuating the clutch mechanism 270. The actuated clutch mechanism 270 connects the retractor shaft 108 for rotation with the unwinding strap member 280. The retractor shaft 108 and the spool 114 (FIG. 4) are driven to rotate in the belt winding direction W (FIG. 5). This rotation of the spool 114 (FIG. 4) winds the seat belt webbing 20 onto the spool, thereby moving the seat belt webbing and tightening the seat belt webbing against the occupant.

An optional dry lubricant may be provided in the main body portion 140 of the pretensioner housing 134. The lubricant reduces friction between the pretensioner band 280 and the main body portion 140 of the pretensioner housing 134. The lubricant also inhibits fluid leakage between the pretensioner band 280 and the housing 134.

When the pretensioner band 280 includes two band members 280*i* and 280*o*, as shown in FIGS. 2 and 2*a*, the inner band member 280*i* can be slightly wider than the outer band member 280*o* to minimize the air gap and reduce the amount of leakage of combustion products between the pretensioner band 280 and the side wall 88 of the retractor frame 82 and the end wall 190 of the pretensioner housing 134. The inner band 280*i* can also be shorter in length than the outer band 280*o*, as shown in FIG. 2*a*. The inner band 280*i* can also be thicker than the outer band 280*o* so that it will produce minimal flexing and leakage during the early stages of deployment of the gas generator 316, which is when the gas pressure and the temperature in the chamber 308 are at their highest level. The pretensioner band 280 may also include an additional band (not shown) of non-metallic material to impart improved sealing and strength properties to the pretensioner band 280.

FIGS. 7–10 illustrate a pretensioner 130*a* which is constructed according to a second embodiment of the present invention. The pretensioner 130*a* can be used with the retractor 22 of the seat belt restraint system 10 of the first embodiment. Parts of the pretensioner 130*a* which are the same as parts of the pretensioner 130 (FIGS. 1–6), are given the same reference numeral. Parts of the pretensioner 130*a* which are different or modified versions of the parts of the pretensioner 130 are given the same reference numerals with a suffix "a".

The pretensioner 130*a* includes a pretensioner housing 134*a* which is extended outward in the area of the gas generator 316 so that the gas generator is not exposed to the exterior of the pretensioner housing. The bore 314a for receiving the gas generator 316 is longer than the bore 314 of the pretensioner housing 130 (FIGS. 1–6). An electrical connection shown schematically at 340 is disposed within the bore 314a adjacent to the gas generator 316. A filler block 370 is disposed in the bore 314a adjacent to the electrical connection 340. The filler block 370 has a smooth exterior surface 374.

An end cap 380 is secured to the housing 134a in a manner not shown. The end cap 380 retains the filler block 370, the electrical connection 340 and the gas generator 316 within the bore 314a. The end cap 380 has a smooth interior surface 384 spaced apart from the exterior surface 374 of the filler block 370. The surfaces 374 and 384 define a narrow passage 168a which wraps around the gas generator 316 and extends along the back of the housing 134a in a direction parallel to the base wall 84 of the retractor frame 82. The passage 168a is longer than the slot 168 (FIGS. 2, 3 and 5).

The flexible member 280a (FIG. 7) is longer than the pretensioner band 280 of the first embodiment and is not secured to the housing 134a with screws. Instead, the pretensioner band 280a has an extended portion 329 which extends through the passage 168a and parallel to the base wall 84 of the retractor frame 82.

Figure 10:
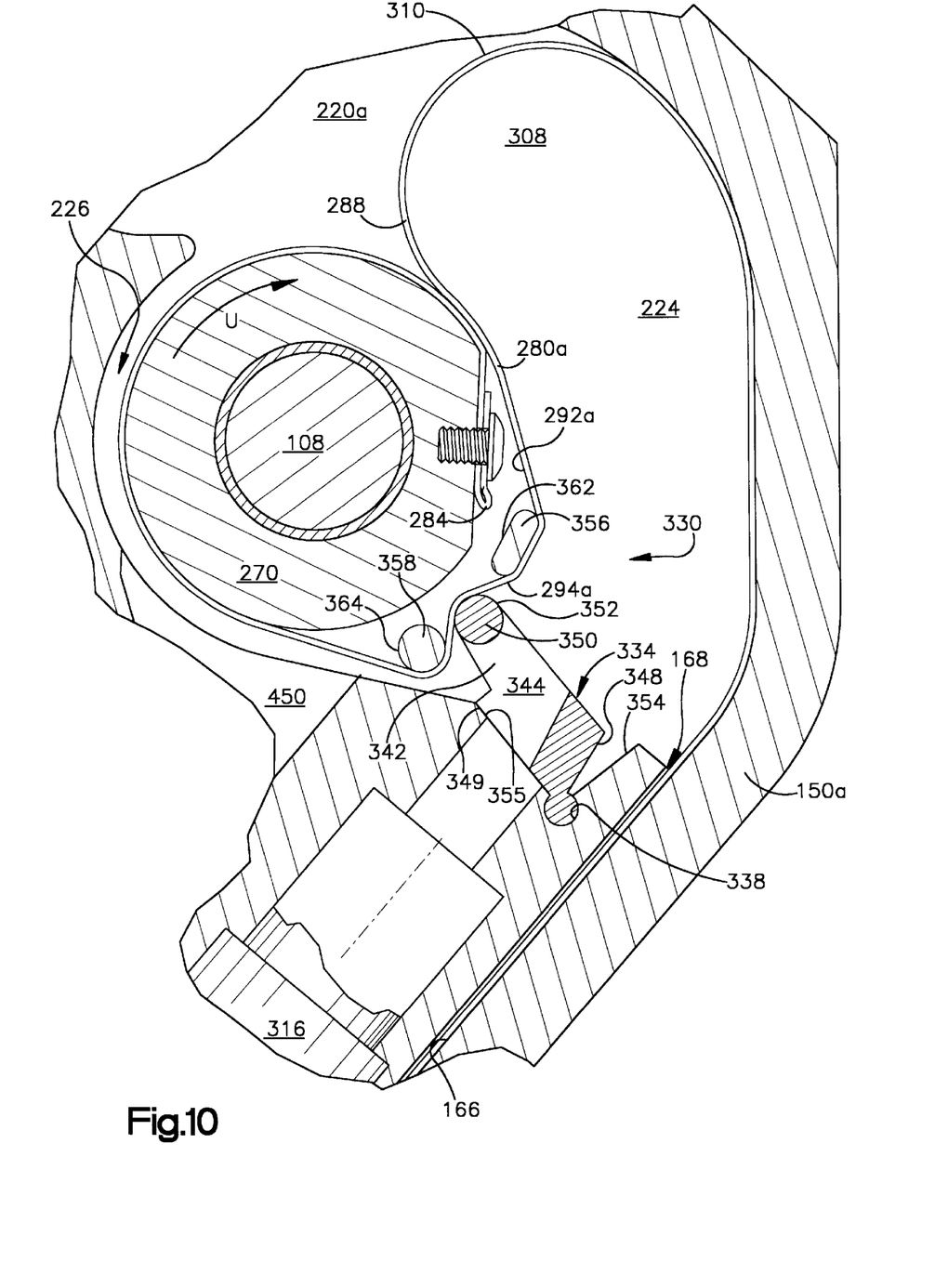
FIG. 10 is an enlarged view of a portion of FIG. 9.
Figure 11:
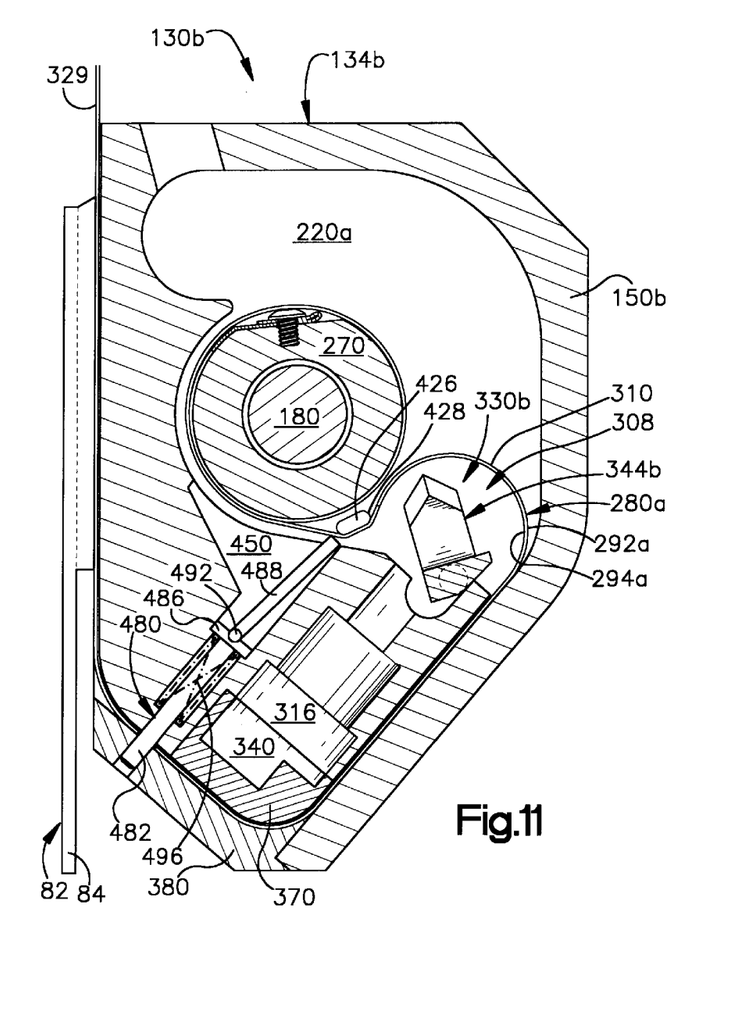
FIG. 11 is a view similar to FIG. 7 showing a retractor including a pretensioner constructed in accordance with a third embodiment of the present invention.

The pretensioner 130a includes an energy absorbing mechanism 330. The energy absorbing mechanism 330 includes a link 334 pivotally mounted in a socket 338 (FIG. 10) in the side wall 150a of the pretensioner housing 134a. The link 334 includes a surface 342 defining a window 344 in the center of the link, as best shown in FIG. 10. The link 334 also includes a planar back stop surface 348, a planar front stop surface 349, and a nose section 350 having an arcuate outer surface 352. The planar back stop surface 348 of the link 334 is presented toward a planar stop surface 354 of the side wall 150a of the housing 134a. The planar front stop surface 349 of the link 334 is presented towards a stop surface 355 of the side wall 150a.

The energy absorbing mechanism 330 also includes a first steel post 356 and a second steel post 358. The first and second posts 356 and 358 extend between the end wall 190 of the pretensioner housing 134a and the side wall 88 of the retractor frame 82. The posts 356 and 358 are disposed between the clutch mechanism 270 and the link 334. The first post 356 has an oval outer surface 362. The second post 358 has a cylindrical outer surface 364.

The pretensioner housing 134a includes a cavity 450 (FIG. 7) which extends between the primary chamber 220a and the exterior surface 158a of the housing 134a. The cavity 450 includes a first passage 454 which extends between the exterior surface 158a of the pretensioner housing 134a and a second, larger, passage 458. A first shoulder 470 is formed at the intersection of the first passage 454 and the second passage 458. The second passage 458 extends between the first passage 454 and a third, still larger, passage 462. The third passage 462 extends between and connects the second passage 458 with a conical passage 466. A second shoulder 474 is formed at the intersection of the second passage 458 and the third passage 462.

A retractable anchoring assembly 480 is disposed within the cavity 450 of the pretensioner housing 134a. The anchoring assembly 480 includes an anchoring pin 482 having a flange 486. The anchoring assembly 480 further includes an actuating rod 488 pivotally connected to the flange 486 of the anchoring pin 482 by a socket 492. A compression spring 496 extends between the first shoulder 470 and the flange 486 and biases the anchoring assembly 480 in a direction towards the primary chamber 220a of the pretensioner 130a.

When the gas generator 316 (FIGS. 7–10) is actuated, combustion products flow through the passage 328 and through the window 344 in the link 334 into the expansible chamber 308. The combustion products pressurize and expand the chamber 308 and cause the pretensioner band 280a to move from its initial position illustrated in FIG. 7 along the arcuate path portion 224 to its final expansion position illustrated in FIG. 8. Expansion of the chamber 308 actuates the clutch mechanism 270, rotating the retractor shaft 108 and the spool 114 in the belt winding direction W to retract a given amount of the seat belt webbing 20 (FIG. 1). The amount of the pretensioner band 280a which is unwound from the clutch 270 during the pretensioning process is preferably about six inches.

Figure 8:
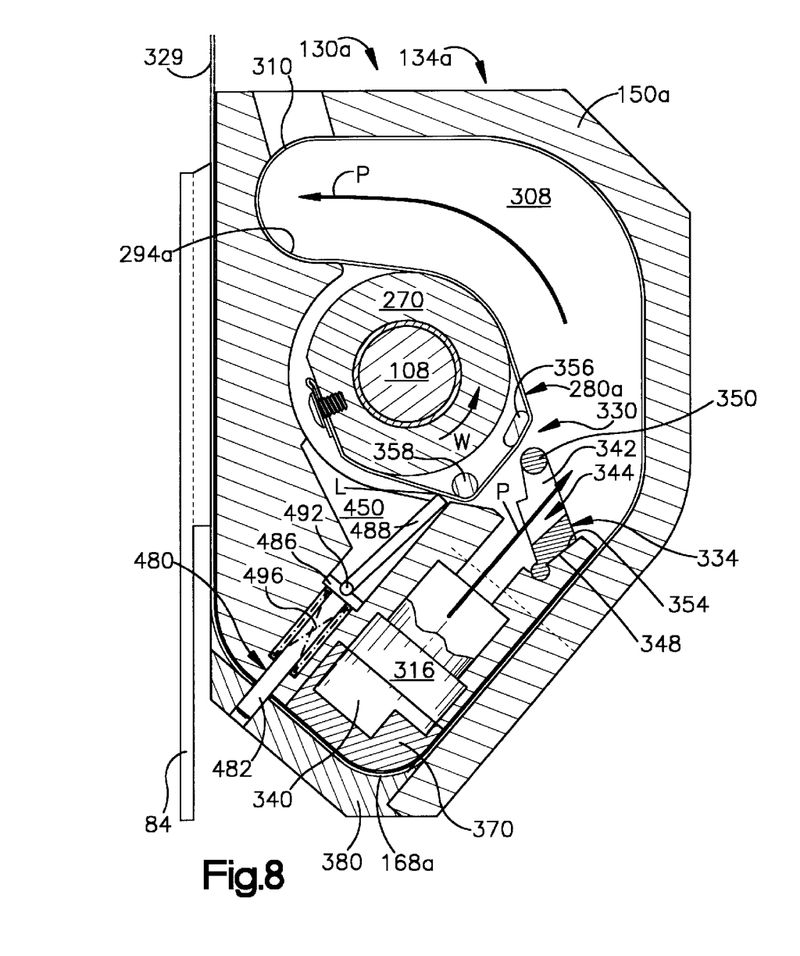
FIG. 8 is a view similar to FIG. 7 showing parts of the pretensioner of FIG. 7 in a different position.

During this pretensioning process, the pretensioner band 280a extends between the link 334 and the steel posts 356 and 358 as shown in FIG. 8. The pressure force P from the gas generator 316 forces the link 334 away from the passage 328 until the back stop surface 348 abuts the stop surface 354, preventing the link from contacting the pretensioner band 280a and impeding its movement during the pretensioning process.

Figure 7:
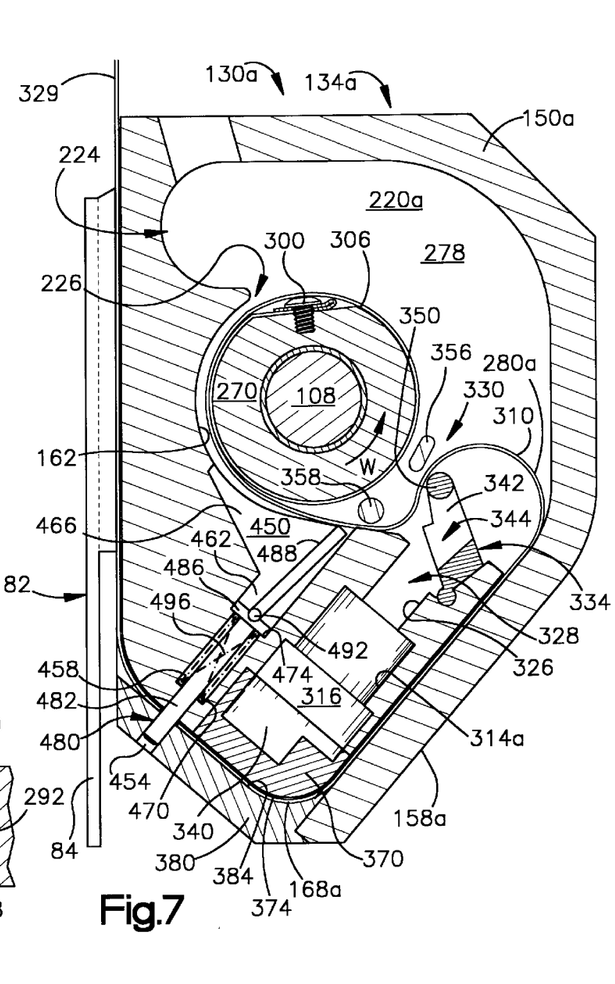
FIG. 7 is a view similar to FIG. 3 showing a retractor including a pretensioner constructed in accordance with a second embodiment of the present invention.

The anchoring assembly 480 remains in the initial position shown in FIGS. 7 and 8 during the pretensioning process. While in the initial position, the anchor pin 482 extends through the passages 454 and 458 and through an aperture in the pretensioner band 280a. The actuating rod 488 pinches the pretensioner band 280a against the first steel post 358 as shown in FIG. 8.

When the pretensioning process concludes, the vehicle occupant can move forward against the seat belt webbing 20 (FIG. 1) due to the deceleration of the vehicle 24. The tension on the seat belt webbing 20 causes the shaft 108, the spool 114, and the clutch mechanism 270 to rotate in the belt unwinding direction indicated by the arrow U in FIGS. 9 and 10. As this occurs, the pretensioner band 280a is wrapped around the outer surface 274 of the clutch mechanism 270.

Figure 9:
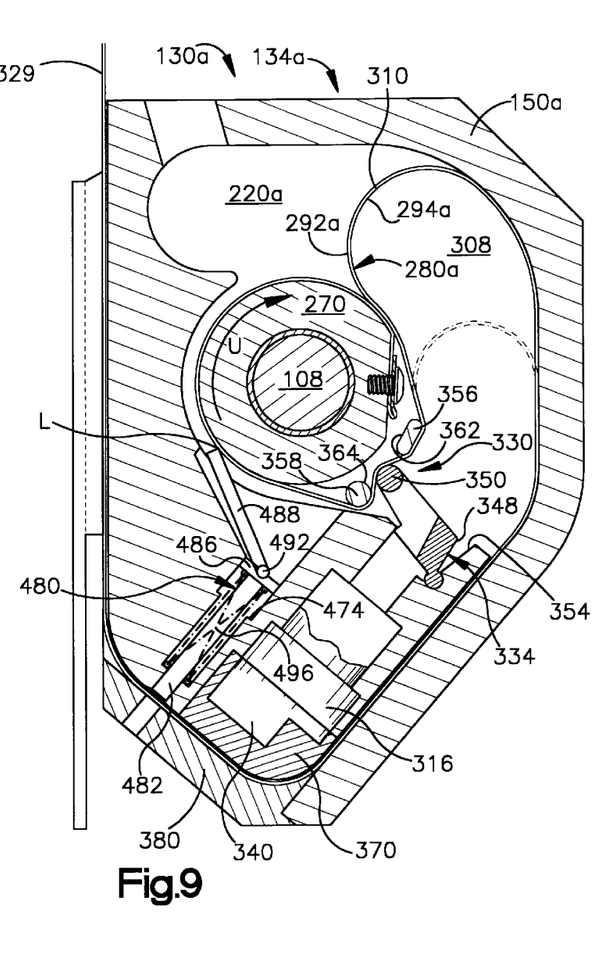
FIG. 9 is a view similar to FIG. 8, showing parts of the pretensioner of FIG. 7 in yet another position.

The pretensioner band 280a moves from the condition shown in FIG. 8 through the condition shown in FIG. 9 and toward the condition shown in FIG. 7. As this movement occurs, the major side surface 294a of the strap 280a engages the circular nose section 350 of the link 334. The friction between the pretensioner band 280a and the link 334 causes the link to pivot toward the second steel post 358 until the front stop surface 349 of the link abuts the stop surface 355 of the side wall 150a. In this position, the link 334 forces the pretensioner band 280 to assume an S-shaped configuration as seen in FIG. 9.

Continued forward movement of the vehicle occupant causes the pretensioner band 280a to be pulled through this S-shaped path. The deformation of the strap member 280a places a reaction load on the seat belt webbing 20. This reaction load is nearly constant and, as will be described below, persists for a distance which is significantly greater than the belt pretensioning distance. The locking pawl mechanism is held out of engagement with the ratchet wheels 116 and 118, in a manner not shown, until the energy absorbing sequence is completed.

As the shaft 108 and the clutch mechanism 270 rotate in the belt unwinding direction U during the energy absorbing process, the pretensioner band 280a, at point L, places a lever action on the end of the actuating rod 488 to urge the actuating rod to pivot from the initial position shown in FIGS. 7 and 8 to the final position shown in FIG. 9. The spring 496 urges the anchoring pin 482 toward the primary chamber 220 of the pretensioner 130a. As a result of this movement, the anchoring pin 482 moves out of the aperture in the pretensioner band 280a.

The extended portion 329 of the pretensioner band 280a is now free to be pulled through the passage 168a by the force of the rotating clutch mechanism 270. The extended portion 329 of the pretensioner band 280a is wound around the outer surface 274 of the clutch mechanism 270. Thus, the energy absorbing function can be applied over an amount of belt webbing 20 which is substantially greater than the seat belt pretensioning distance. Preferably, the pretensioner 130a of the second embodiment is capable of an energy absorbing distance of about 16 inches.

FIGS. 11–14 illustrate a pretensioner 130b which is constructed in accordance with a third embodiment of the present invention. The pretensioner 130b can be used with the retractor 22 of the seat belt restraint system 10 of the first two embodiments. Parts of the pretensioner 130b which are the same as parts of the pretensioners 130 and 130a (FIGS. 1–10), are given the same reference numerals. Parts of the pretensioner 130b which are different or modified versions of the parts of the pretensioner 130 or 130a are given the same reference numeral with the suffix "b".

The pretensioner 130b is similar to the pretensioner 130a but has a different energy absorbing mechanism 330b. The energy absorbing mechanism 330b includes a link 334b (FIG. 12) having a base section 404. Two cylindrical pivot pins 408 extend from opposite ends of the base section 404. The pivot pins 408 are received in openings in the side wall 150b and support the link 334b for pivotal movement relative to the housing 134b.

Figure 12:
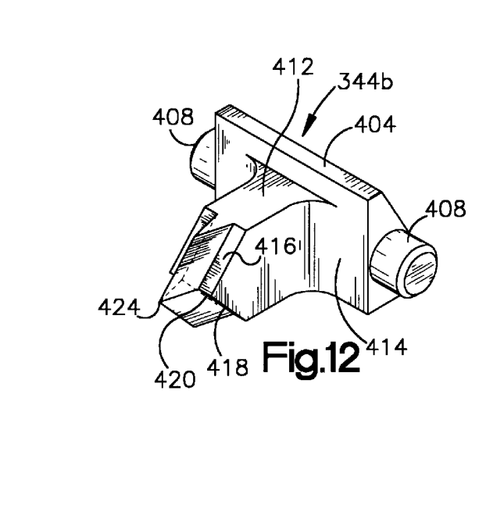
FIG. 12 is an enlarged perspective view of a cutter member which forms a part of the retractor of FIG. 11.
Figure 13:
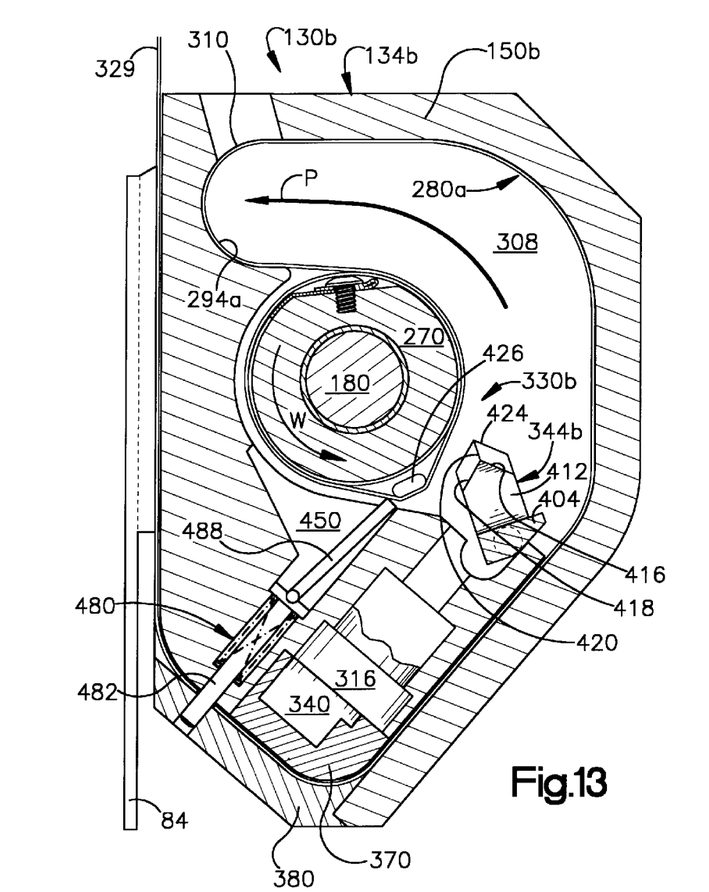
FIG. 13 is a view similar to FIG. 11 showing parts of the pretensioner of FIG. 11 in a different position.

The link 334b also includes a narrow web section 412 extending from a planar side 414 of the base section 404. The web section 412 has surfaces 416 and 418 which converge at a point 420. The narrow web section 412 also has converging surfaces which extend from the surfaces 416 and 418 and define a cutting edge 424.

The energy absorbing mechanism 330b further includes a steel post 426 having an oval outer surface 428. The steel post 426 is rigidly fixed to the housing 134b at a location between the clutch mechanism 270 and the link 334b.

The pretensioning process for the pretensioner 130b is initiated and occurs in a manner similar to that described above with reference to the second embodiment of the invention as illustrated in FIGS. 8–10. The web section 412 is narrow enough to enable the flow of gaseous combustion products from the gas generator 316 to enter the expansible chamber 308 essentially unimpeded by the link 334b.

Figure 14:
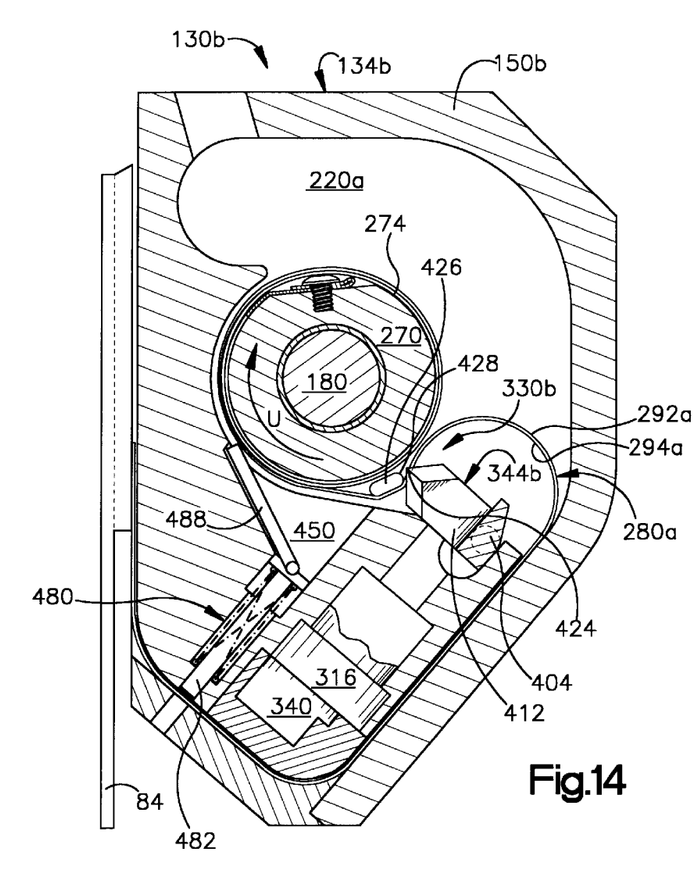
FIG. 14 is a view similar to FIG. 13 showing parts of the pretensioner of FIG. 11 in yet another position.

After the pretensioning process has concluded, the occupant moves forward against the seat belt webbing 20 due to the deceleration of the vehicle. The force on the seat belt webbing 20 causes the shaft 108, the spool 114, and the clutch mechanism 270 to rotate in the belt unwinding direction indicated by the arrow U in FIG. 14. As the shaft 108, the spool 114, and the clutch mechanism 270 rotate in the belt unwinding direction, the pretensioner band 280a is pulled between the link 334b and the post 426 and wraps around the outer surface 274 of the clutch mechanism 270 as shown in FIG. 14. Also, as the shaft 108, the spool 114 and the clutch mechanism 270 rotate in the unwinding direction, the pretensioner band 280a is pulled between the post 426 and the actuator rod 488, producing sufficient friction to pivot the actuator rod and enable the anchor pin rod 482 to disengage from the pretensioner band.

The major side surface 294a of the pretensioner band 280a engages the cutting edge 424 of the link 334b, and the major side surface 292a engages the outer surface 428 of the post 426. The friction between the major side surface 294a of the pretensioner band 280a and the cutting edge 424 of the link 334b causes the link to pivot toward the post 426.

As the link 334b pivots towards the post 426, the cutting edge 424 on the link cuts or slices through the pretensioner band or strap member 280a. As the pretensioner band 280a is pulled past the cutting edge 424 of the link 334b by the action of the occupant moving the seat belt webbing 20, the link continues to slice through the strap member 280a, including the extension portion 329 of the strap member. This cutting of the strap member 280a produces a reaction load on the seat belt webbing 20 which is nearly constant over a distance substantially greater than the seat belt pretensioning distance. Preferably, the pretensioner 130b of the third embodiment is capable of an energy absorbing distance of about 16 inches.

Figure 15:
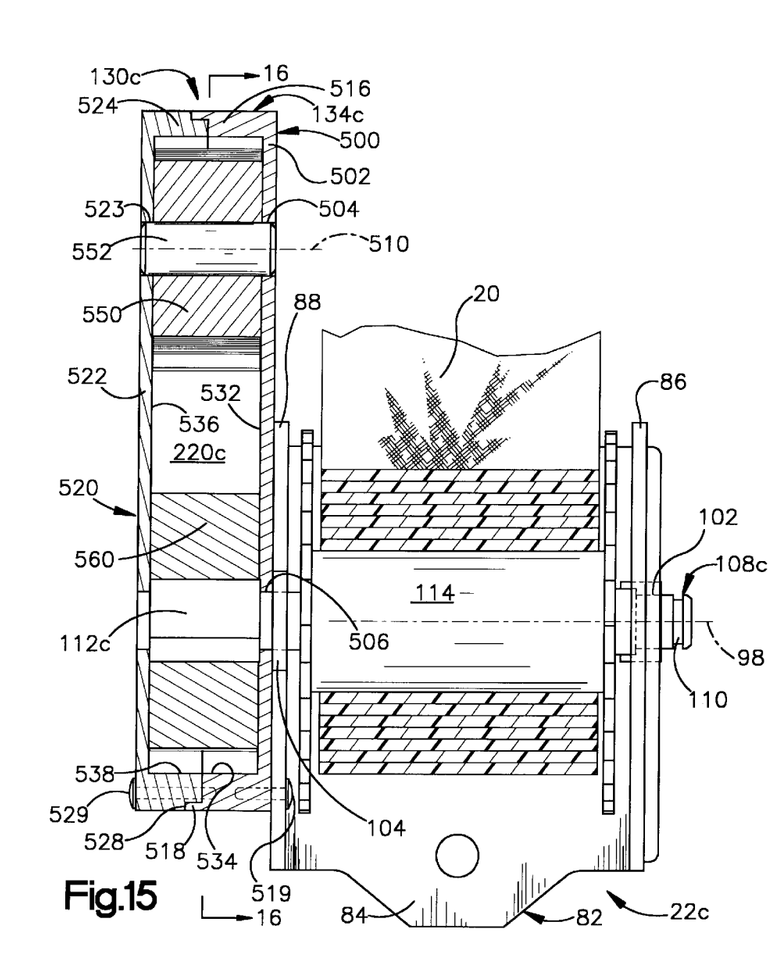
FIG. 15 is a view similar to FIG. 4 showing a retractor including a pretensioner constructed in accordance with a fourth embodiment of the present invention.
Figure 16:
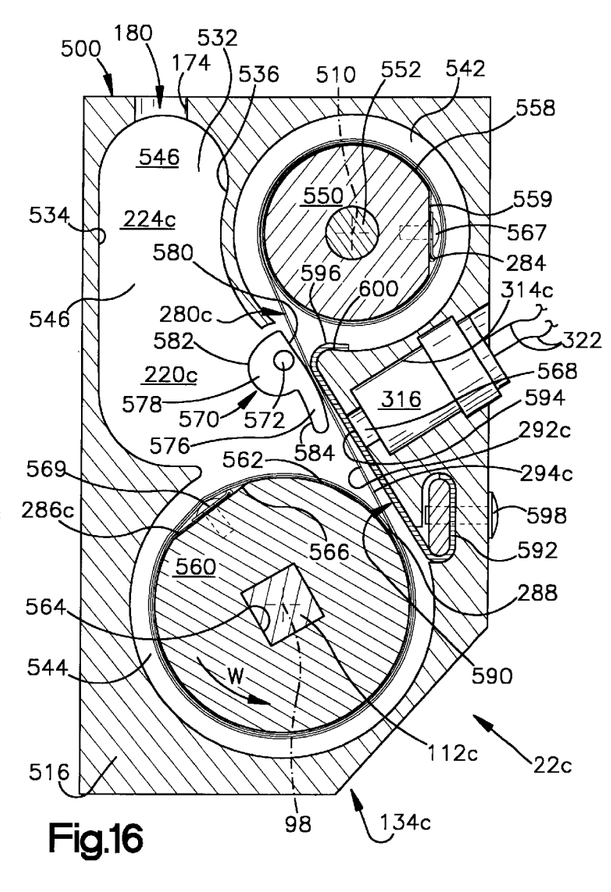
FIG. 16 is a sectional view taken along line 16—16 of the pretensioner of FIG. 15.
Figures 17, 18, 19:
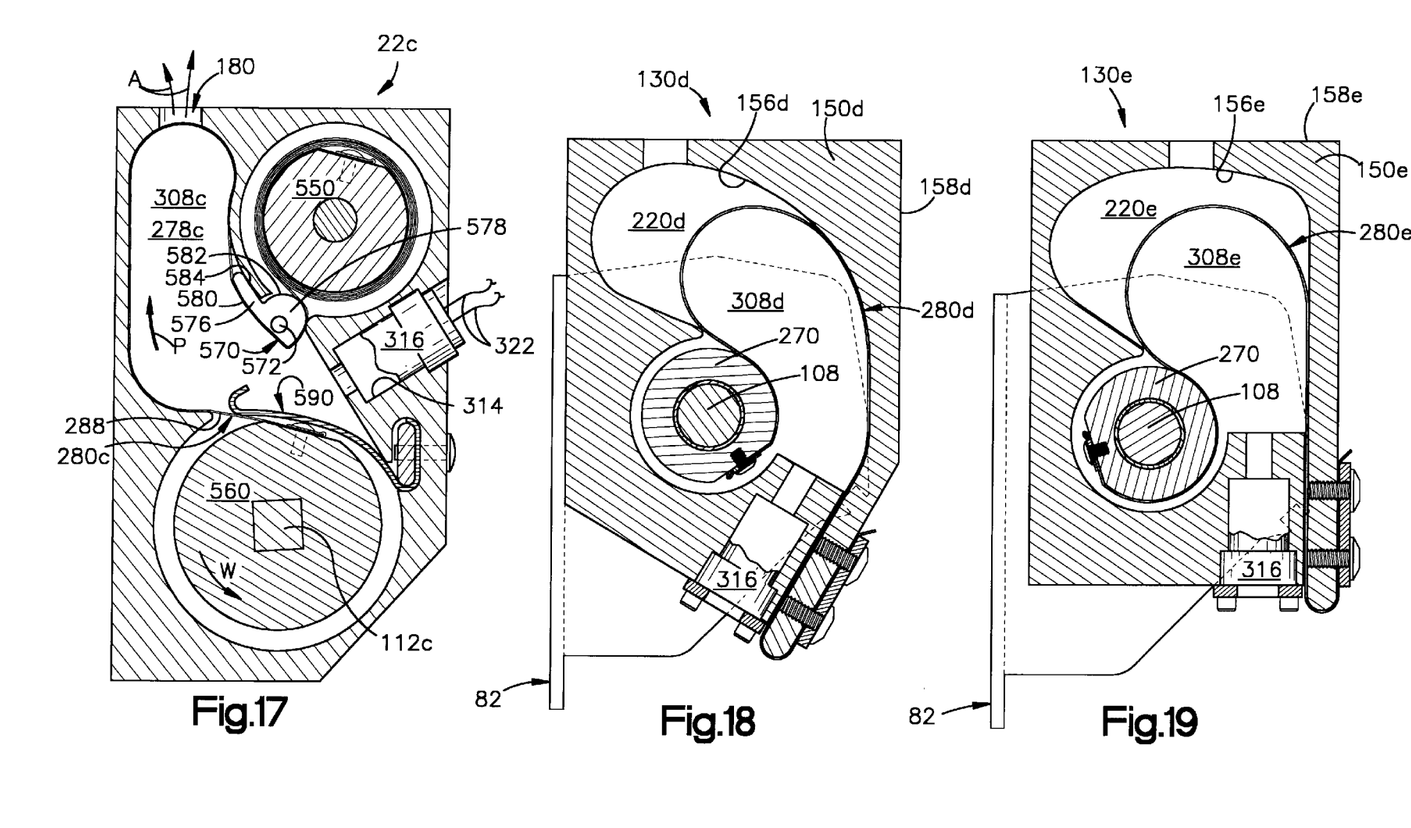
FIG. 17 is a view similar to FIG. 16 showing parts of the pretensioner in a different position.
FIG. 18 is a view similar to FIG. 5 showing a pretensioner constructed in accordance with a fifth embodiment of the present invention.
FIG. 19 is a view similar to FIG. 18 showing a pretensioner constructed in accordance with a sixth embodiment of the present invention.

FIGS. 15–17 illustrate a retractor 22c which is constructed in accordance with a fourth embodiment of the present invention. The retractor 22c can be used with the vehicle occupant seat belt restraint system 10 of the first three embodiments. Parts of the retractor 22c which are the same as parts of the retractor 22 (FIGS. 1–14) are given the same reference numeral. Parts of the retractor 22c which are different or modified version of parts of the retractor 22 are given the same reference numeral with a suffix "c".

The retractor 22c includes a pretensioner 130c. The pretensioner 130c includes a pretensioner housing 134c which is attached to the side wall 88 of the retractor frame 82. The pretensioner housing 134c includes a base portion 500. The base portion 500 includes an end wall 502 having an inner side surface 532. The end wall 502 includes a first circular opening 504 centered on an axis 510 and a second circular opening 506 centered on the central axis 98 of the retractor 22c.

The base portion 500 of the pretensioner housing 134c also includes a side wall 516, extending outward from the end wall 502. The side wall 516 has an inner side surface 534 and an outer peripheral rim 518. The base portion 500 of the pretensioner housing 134c is attached to the side wall 88 of the frame 82 by at least one rivet 519.

A cover portion 520 of the pretensioner housing 134c includes a planar end wall 522 having an inner side surface 536. The end wall 522 has a circular opening 523 which is coaxial with the opening 504 in the base portion 500. The cover portion 520 includes a side wall 524 which has an inner side surface 538 and an axially extending outer peripheral shoulder 528. The shoulder 528 on the cover portion 520 receives the rim 518 on the base portion 500. The cover portion 520 of the pretensioner housing 134c is attached to the base portion by at least one fastener 529.

The inner side surfaces 532, 534, 536 and 538 on the pretensioner housing 134c define a chamber 220c. The chamber 220c (FIG. 16) includes a first portion 542. The first portion 542 of the chamber 220c has a generally cylindrical configuration centered on the axis 510. A second portion 544 of the chamber 220c has a generally cylindrical configuration centered on the axis 98. The first portion 542 of the chamber 220c is located above (as viewed in FIG. 16) the second portion 544 and to the right of a third portion 546 of the chamber 220c. The third portion 546 of the chamber 220c is located above the second portion 544 and to the left of the first portion 542 as viewed in FIG. 16. The third portion 546 of the primary chamber 220c forms an arcuate path portion 224c of the chamber 220c.

A supply pulley 550 is disposed within the first portion 542 of the chamber 220c. The supply pulley 550 (FIG. 15)

is supported for rotation on a second shaft 552 which is fixed within the openings 504 and 523 in the housing 134c. The supply pulley 550 has a generally cylindrical outer surface 558 (FIG. 16) which includes a flattened portion 559.

A take-up spool 560 is disposed within the second portion 544 of the chamber 220c. The take-up spool 560 has a generally cylindrical outer surface 562 and a square central bore 564. The cylindrical outer surface 562 includes a flattened portion 566. The second end 112c of the shaft 108c has a square cross-sectional configuration and is received within the central bore 564 of the take-up spool 560. Thus, the take-up spool 560 is rotatable with the shaft 108c and the spool 114 in opposite directions about the axis 98.

A pretensioner spring 280c is disposed within the chamber 220c. The pretensioner spring 280c has opposite major side surfaces 292c and 294c, and opposite minor side surfaces which interconnect the major sides surfaces 292c and 294c. An intermediate portion 288 of the pretensioner spring 280c extends between the first end portion 284 and a second end portion 286c of the pretensioner spring. The intermediate portion 288 cooperates with the inner surface 532 of the end wall 502 and the inner surface 536 of the end wall 522 to define an expansible chamber 308c best seen in FIG. 17.

The first end portion 284 (FIG. 16) of the pretensioner spring 280c is attached to the flattened portion 559 of the outer surface 558 of the supply pulley 550 by a screw 567. The pretensioner spring 280c is then initially wound tightly in a first direction onto the supply pulley 550 in a prestressed condition. With a portion of the pretensioner spring 280c unwound from the supply pulley 550, the second end portion 286c of the pretensioner spring 280c is attached to the flattened portion 566 of the outer surface 562 of the take-up spool 560 by a screw 569. The pretensioner spring 280c is wound in the opposite direction around the outer surface 562 of the take-up spool 560. Thus, the pretensioner spring 280c develops a restoring torque in the direction of the arrow W (FIG. 16) which, through the take-up spool 560 and the shaft 112, acts to wind the seat belt webbing 20 on the spool 114 in the winding direction W. The pretensioner spring 280c thus acts as a "B" motor spring or rewind spring for the retractor 22c.

The pretensioner housing 134c includes a bore 314c in which an actuatable pyrotechnic gas generator 316 is secured. The actuatable pyrotechnic gas generator 316 is electrically connected by wires 322 to a controller (not shown). A cylindrical passage 568 extends between the gas generator 316 and the chamber 220c.

A brake 570 is supported on a third shaft 572 for pivotal movement relative to the pretensioner housing 134c. The brake 570 has three outer side surfaces 580, 582, and 584 which cooperate to define a generally planar finger portion 576 and an enlarged base portion 578. The brake 570 has an initial position shown in FIG. 16 in which the first surface 580 of the brake 570 is presented towards the gas generator 316.

The pretensioner housing 134c includes a pivotable or flexible shield 590, shown in FIGS. 16 and 17, for protecting the pretensioner spring 280c from the gaseous combustion products and debris produced upon actuation of the gas generator 316. The shield 590 has a curved base portion 592, a hook portion 596, and an arm portion 594 which extends between the base portion 592 and the hook portion 596. The base portion 592 of the shield 590 is secured to the pretensioner housing 134c by a rivet 598. When the pretensioner 130c is unactuated, the hook portion 596 fits over a curved surface 600 of the pretensioner housing 134c, and the arm portion 594 extends between the passage 568 and the chamber 220c.

When the pretensioner 130c is actuated, the gas generator 316 produces combustion products which flow through the passage 568 and engage the arm portion 594 of the shield 590. The force of the combustion products urges the shield 590 away from the gas generator 316, disengaging the hook portion 596 of the shield from the curved surface 600. The shield 590 pivots towards the spool 560 as shown in FIG. 17. In this position, the shield 590 also acts to block the flow of combustion products into the second portion 544 of the chamber 220c. The pivoting hook portion 596 of the shield 590 forces the brake 570 to pivot about its axis 572 to a final position (or locking position) as shown in FIG. 17. The base portion 578 of the brake 570 clamps the pretensioner spring 280c against the surface 600 on the pretensioner housing 134c. This clamping action prevents the strap member 280c from being pulled from the supply spool 550 and also acts to block the flow of combustion products into the first portion 542 of the chamber 220c.

The combustion products of the gas generator 316 produce a pressure force P, in the expansible chamber 308c, which is greater than the restoring torque of the pretensioner spring 280c. The pressure force P urges the intermediate portion 288 of the pretensioner spring 280c into the third portion 546 of the chamber 220c along the arcuate path portion 224c as shown in FIG. 17. As the pretensioner spring 280c progresses further along the arcuate path portion 224c in the third portion 546 of the chamber 220c, a portion of the intermediate portion 288 is unwound from the take-up spool 560, thereby rotating the take-up spool in the belt winding direction W. This rotation of the take-up spool 560 rotates the shaft 108c and the spool 114 in the belt winding direction W, thereby winding the seat belt webbing 20 onto the spool 114 to move the seat belt webbing and tighten the seat belt webbing against the occupant.

FIGS. 18 and 19 illustrate pretensioners 130d and 130e which are constructed according to fifth and sixth embodiments of the present invention, respectively. Parts of the pretensioners 130d and 130e which are the same as parts of the pretensioner 130 (FIGS. 1–6), are given the same reference numeral. Parts of the pretensioners 130d and 130e which are different or modified versions of the parts of the pretensioner 130 are given the same reference numerals with a suffixes "d" or "e", respectively.

The pretensioner 130d (FIG. 18) includes a side wall 150d having an inner surface 156d and an outer surface 158d. The inner surface 156d of the side wall 150d defines a primary chamber 220d having a different cross-sectional profile than the primary chambers shown in the previous embodiments. The chamber 220d has a greater volume than that of the primary chambers 220–220c of the previous embodiments. Thus, the chamber 220d can accommodate an even greater length of pretensioner spring 280d and can thereby define an expansible chamber 308d having an even greater volume than the expansible chambers 308–308c of the first four embodiments. The pretensioner 130d thus enables a greater amount of seat belt webbing to be rewound in the pretensioning cycle.

The pretensioner 130e (FIG. 19) includes a side wall 150e having an inner surface 156e and an outer surface 158e. The inner surface 156e of the side wall 150e defines a primary chamber 220e having a different cross-sectional profile than the primary chambers shown in the previous embodiments. The chamber 220e has a greater volume than that of the primary chambers 220–220d of the previous embodiments. Thus, the chamber 220e can accommodate a greater length of pretensioner spring 280e can thereby define an expansible chamber 308e having a greater volume than the expansible chambers 308–308d of the first five embodiments. The pretensioner 130e thus enables a greater amount of seat belt webbing to be rewound in the pretensioning cycle.

From the above description of the invention, those skilled in the art will perceive improvements, changes and modifications in the invention. For example, housing chambers having configurations different from those shown in the drawings can be provided to vary the pretensioning process. Such improvements, changes and modifications within the skill of the art are intended to be covered by the appended claims.

Having described the invention, we claim:

1. An apparatus comprising:

vehicle seat belt webbing which is extensible about a vehicle occupant;

a housing connectable to a component of a vehicle;

a flexible member having a first end portion, a second end portion, and an intermediate portion extending between said first and second end portions, a part of said intermediate portion being located in said housing and cooperating with said housing to define an expansible chamber in said housing, said housing having surface means for guiding movement of said part of said intermediate portion in an arcuate path to expand said expansible chamber;

a clutch actuatable in response to expansion of said expansible chamber to connect said first end portion with said seat belt webbing;

actuatable means for, when actuated, initially exerting a first force directly on said part of said intermediate portion to move said part of said intermediate portion along said arcuate path in said housing to expand said expansible chamber and thereby actuate said clutch and to move said first end portion of said flexible member in a direction to move said seat belt webbing a first distance and tighten said seat belt webbing against the vehicle occupant;

said actuatable means comprising a fluid generator which, when actuated, initially directs fluid under pressure against said intermediate portion of said flexible member; and an energy absorbing mechanism for dissipating energy transferred to said seat belt webbing in response to movement of the occupant against said seat belt webbing, said energy absorbing mechanism being capable of dissipating energy for a distance significantly greater than said first distance;

said energy absorbing mechanism engaging said flexible member in response to movement of the occupant against said seat belt webbing.

2. An apparatus comprising:

vehicle seat belt webbing which is extensible about a vehicle occupant;

a housing connectable to a component of a vehicle;

a flexible member having a first end portion, a second end portion, and an intermediate portion extending between said first and second end portions, a part of said intermediate portion being located in said housing and cooperating with said housing to define an expansible chamber in said housing, said housing having surface means for guiding movement of said part of said intermediate portion in an arcuate path to expand said expansible chamber; and actuatable means for, when actuated, exerting a first force on said part of said intermediate portion to move said part of said intermediate portion along said arcuate path in said housing to expand said expansible chamber and to move said first end portion of said flexible member in a direction to move said seat belt webbing a first distance and tighten said seat belt webbing against the vehicle occupant;

said first end portion of said flexible member being connected with a seat belt retractor to effect retraction of said seat belt webbing in response to expansion of said expansible chamber;

said surface means of said housing comprising a wall having an arcuate inner surface which at least partially defines said arcuate path;

said flexible member comprising first and second generally parallel major side surfaces interconnected by first and second minor side surfaces;

said actuatable means comprising a fluid generator which directs fluid under pressure against said intermediate portion of said flexible member, said surface means of said housing further comprising opposed surfaces connected by said wall, said minor side surfaces of said flexible member cooperating with said opposed surfaces of said housing to inhibit fluid flow between said flexible member and said housing;

said first end portion of said flexible member being connected to a spool rotatable in opposite belt withdrawal and belt retraction directions, said flexible member creating a second force smaller than said first force, said second force acting on said spool to wind said belt webbing in the belt retraction direction.

3. An apparatus comprising:

a vehicle seat belt webbing which is extensible about a vehicle occupant;

a housing connectable to a component of a vehicle;

a flexible member having a first end portion, a second end portion, and an intermediate portion between said first and second end portions, said first end portion being connectable with said vehicle seat belt webbing, a part of said intermediate portion being located in said housing and cooperating with said housing to define an expansible chamber in said housing, said housing having surface means for guiding movement of said intermediate portion in an arcuate path;

actuatable means for, when actuated, exerting a first force on said part of said intermediate portion to move said intermediate portion along said arcuate path in said housing and expand said expansible chamber and move said first end portion of said flexible member in a direction to move said seat belt webbing a first distance and tighten said seat belt webbing against the occupant; and an energy absorbing mechanism for dissipating energy transferred to said seat belt webbing in response to movement of the occupant against said seat belt webbing, said energy absorbing mechanism being capable of dissipating energy for a distance significantly greater than said first distance;

said energy absorbing mechanism engaging said flexible member in response to movement of the occupant against said seat belt webbing.

4. The apparatus of claim 3 wherein said first end portion of said flexible member is connected with a seat belt webbing retractor to effect retraction of said seat belt webbing in response to expansion of said chamber.

5. The apparatus of claim 4 wherein said housing comprises a first end wall of said retractor, an annular second end wall, and a side wall extending between and connecting said first and second end walls, said side wall having an inner surface which at least partially defines said arcuate path.

6. The apparatus of claim 5 wherein said seat belt retractor comprises a rotatable shaft having an end portion which extends into said housing, said housing containing a clutch selectively connectable for rotation with said shaft, said seat belt webbing being connected with said shaft and said first end portion of said flexible member being connected with said clutch for selectively connecting said first end portion of said flexible member with said seat belt webbing.

7. The apparatus of claim 6 wherein said clutch has an outer surface which at least partially defines said arcuate path.

8. The apparatus of claim 7 wherein said intermediate portion of said flexible member is wrapped around said clutch when said actuatable means is unactuated.

9. An apparatus comprising:
a vehicle seat belt webbing which is extensible about a vehicle occupant;
a housing connectable to a component of a vehicle;
a flexible member having a first end portion, a second end portion, and an intermediate portion between said first and second end portions, said first end portion being connectable with said vehicle-seat belt webbing, a part of said intermediate portion being located in said housing and cooperating with said housing to define an expansible chamber in said housing, said housing having surface means for guiding movement of said intermediate portion in an arcuate path;
actuatable means for, when actuated, exerting a first force on said part of said intermediate portion to move said intermediate portion along said arcuate path in said housing and expand said expansible chamber and move said first end portion of said flexible member in a direction to move said seat belt webbing a first distance and tighten said seat belt webbing against the occupant; and
an energy absorbing mechanism for dissipating energy transferred to said seat belt webbing in response to movement of the occupant against said seat belt webbing, said energy absorbing mechanism being capable of dissipating energy for a distance significantly greater than said first distance;
said first end portion of said flexible member is connected with a seat belt webbing retractor to effect retraction of said seat belt webbing in response to expansion of said chamber;
said housing comprising a first end wall of said retractor, an annular second end wall, and a side wall extending between and connecting said first and second end walls, said side wall having an inner surface which at least partially defines said arcuate path;
said seat belt retractor comprising a rotatable shaft having an end portion which extends into said housing, said housing containing a clutch selectively connectable for rotation with said shaft, said seat belt webbing being connected with said shaft and said first end portion of said flexible member being connected with said clutch for selectively connecting said first end portion of said flexible member with said seat belt webbing;
said clutch has an outer surface which at least partially defines said arcuate path;
said intermediate portion of said flexible member is wrapped around said clutch when said actuatable means is unactuated;
said energy absorbing mechanism comprising a first post, a second post, and a link member, said posts and said link extending transverse to and between said end walls, said posts being disposed intermediate said clutch and said link, said flexible member extending between said posts and said link and moving into frictional engagement with said posts and said link in response to movement of the occupant against said seat belt webbing.

10. An apparatus comprising:
a vehicle seat belt webbing which is extensible about a vehicle occupant;
a housing connectable to a component of a vehicle;
a flexible member having a first end portion, a second end portion, and an intermediate portion between said first and second end portions, said first end portion being connectable with said vehicle seat belt webbing, a part of said intermediate portion being located in said housing and cooperating with said housing to define an expansible chamber in said housing, said housing having surface means for guiding movement of said intermediate portion in an arcuate path;
actuatable means for, when actuated, exerting a first force on said part of said intermediate portion to move said intermediate portion along said arcuate path in said housing and expand said expansible chamber and move said first end portion of said flexible member in a direction to move said seat belt webbing a first distance and tighten said seat belt webbing against the occupant; and
an energy absorbing mechanism for dissipating energy transferred to said seat belt webbing in response to movement of the occupant against said seat belt webbing, said energy absorbing mechanism being capable of dissipating energy for a distance significantly greater than said first distance;
said first end portion of said flexible member is connected with a seat belt webbing retractor to effect retraction of said seat belt webbing in response to expansion of said chamber;
said housing comprising a first end wall of said retractor, an annular second end wall, and a side wall extending between and connecting said first and second end walls, said side wall having an inner surface which at least partially defines said arcuate path;
said seat belt retractor comprising a rotatable shaft having an end portion which extends into said housing, said housing containing a clutch selectively connectable for rotation with said shaft, said seat belt webbing being connected with said shaft and said first end portion of said flexible member being connected with said clutch for selectively connecting said first end portion of said flexible member with said seat belt webbing;
said clutch has an outer surface which at least partially defines said arcuate path;
said intermediate portion of said flexible member is wrapped around said clutch when said actuatable means is unactuated; and
said energy absorbing mechanism comprising a post and a link having a cutting portion, said post and said link extending transverse to and between said end walls, said post being disposed intermediate said clutch and said link, said flexible member extending between said link and said post and said cutting means moving into engagement with said flexible member to cut said flexible member in response to movement of the occupant against said seat belt webbing of at least a predetermined magnitude.

11. An apparatus comprising:

vehicle seat belt webbing which is extensible about a vehicle occupant;

a housing connectable to a component of a vehicle;

a flexible member having a first end portion, a second end portion, and an intermediate portion extending between said first and second end portions, a part of said intermediate portion being located in said housing and cooperating with said housing to define an expansible chamber in said housing, said housing having surface means for guiding movement of said part of said intermediate portion in an arcuate path to expand said expansible chamber;

a clutch actuatable in response to expansion of said expansible chamber to connect said first end portion with said seat belt webbing; and actuatable means for, when actuated, exerting a first force on said part of said intermediate portion to move said part of said intermediate portion along said arcuate path in said housing to expand said expansible chamber and actuate said clutch and to move said first end portion of said flexible member in a direction to move said seat belt webbing a first distance and tighten said seat belt webbing against the vehicle occupant;

said flexible member comprising a plurality of flexible straps, said straps being substantially the same size as each other and being arranged in an overlying relationship.

12. An apparatus comprising:

vehicle seat belt webbing which is extensible about a vehicle occupant, said seat belt webbing having a first end portion and a second end portion;

a housing connectable to a component of a vehicle;

a spool supported for rotation within said housing in first and second opposite directions and being connected with one of said end portions of said seat belt webbing;

a spring assembly for creating a first force for rotating said spool in the first direction; and actuatable means for, upon actuation, creating a second force greater than said first force and acting on said spring assembly to move said seat belt webbing and tighten said seat belt webbing against the vehicle occupant.

13. The apparatus of claim 12 wherein said spring assembly comprises a pulley rotatable in opposite directions and a flexible member having a first end portion, a second end portion, and an intermediate portion extending between said first and second end portions, said first end portion of said flexible member being connected to said pulley, said flexible member cooperating with said housing to define an expansible chamber in said housing.

14. The apparatus of claim 13 wherein said pulley is fixed for rotation with a retractor spool, said seat belt webbing being wound on said retractor spool, said pulley and said retractor spool rotating in a belt retraction direction to effect retraction of said seat belt webbing in response to expansion of said expansible chamber.

15. The apparatus of claim 14 wherein said housing comprises walls having inner surfaces defining a housing chamber through which said flexible member moves in an arcuate path in response to actuation of said actuatable means.

16. The apparatus of claim 15 further comprising means for blocking rotation of said spool in response to actuation of said actuatable means.

17. The apparatus of claim 15 wherein said housing chamber comprises first, second, and third chamber portions in fluid communication with each other, said spool being located within said first chamber portion, said pulley being located within said second chamber portion, said third chamber portion comprising said arcuate path, said means for blocking rotation of said spool also blocking fluid communication between said first and third chamber portions in response to actuation of said actuatable means.

18. The apparatus of claim 17 further comprising means for protecting said flexible member from combustion products produced in response to actuation of said actuatable means, said means for protecting said flexible member also blocking fluid communication between said second and third chamber portions in response to actuation of said actuatable means.

* * * * *